US007278521B2

(12) United States Patent
Idei et al.

(10) Patent No.: US 7,278,521 B2
(45) Date of Patent: Oct. 9, 2007

(54) DISC ROTOR OF DISC BRAKE DEVICE FOR VEHICLE AND DISC BRAKE DEVICE

(75) Inventors: Shoji Idei, Kakogawa (JP); Seiichi Ino, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 10/936,931

(22) Filed: Sep. 8, 2004

(65) Prior Publication Data

US 2005/0056497 A1    Mar. 17, 2005

(30) Foreign Application Priority Data

Sep. 12, 2003  (JP) .............................. 2003-321677

(51) Int. Cl.
*F16D 65/12*   (2006.01)
(52) U.S. Cl. .............................. 188/218 XL; 188/18 A
(58) Field of Classification Search ......... 188/218 XL, 188/17, 18 R, 18 A, 71.1, 71.6, 344, 250 G, 188/250 B, 264 R, 264 A, 264 AA; 180/219; 474/152, 158
See application file for complete search history.

(56) References Cited

U.S. PATENT DOCUMENTS

| 3,348,637 | A | * | 10/1967 | Perez ........................ 188/346 |
| 4,155,601 | A | * | 5/1979 | Ito ............................. 301/6.8 |
| 4,288,942 | A | * | 9/1981 | Nicholl ........................ 446/48 |
| 5,249,650 | A | * | 10/1993 | Tanaka ........................ 188/344 |
| 5,740,891 | A | * | 4/1998 | Song ........................... 188/326 |
| 5,992,587 | A | * | 11/1999 | Maldonado ................. 188/344 |
| 6,032,767 | A | * | 3/2000 | Roehling .................... 188/73.1 |
| 6,260,669 | B1 | * | 7/2001 | Daudi ......................... 188/71.6 |
| 6,283,255 | B1 | * | 9/2001 | Gardner et al. ........... 188/18 A |
| 2002/0088675 | A1 | * | 7/2002 | Yoko ........................... 188/71.1 |

FOREIGN PATENT DOCUMENTS

| DE | 010212670 A1 | * | 12/2002 |
| JP | 402102933 A | * | 4/1990 |
| JP | 409263284 A | * | 10/1997 |

* cited by examiner

*Primary Examiner*—Pam Rodriguez
(74) *Attorney, Agent, or Firm*—Alleman Hall McCoy Russell & Tuttle LLP (57) ABSTRACT

A disc rotor of a disc brake device for a vehicle, the disc rotor being substantially disc-shaped, is disclosed, including a flange portion with which the disc rotor is mounted on a wheel of the vehicle, and a brake portion formed coaxially with a rotational axis of the disc rotor and configured to be seized by a caliper of the disc brake device, wherein the brake portion is configured to protrude in one direction of the rotational axis relative to the flange portion.

7 Claims, 8 Drawing Sheets

DISC ROTOR OF DISC BRAKE DEVICE FOR VEHICLE AND DISC BRAKE DEVICE

BACKGROUND OF THE INVENTION

1. Field of the Invention

The present invention relates to a disc rotor of a disc brake device configured to brake a wheel mounted on a vehicle, and a disc brake device equipped with a disc rotor. More particularly, the present invention relates to a disc rotor capable of improving heat radiation, and a disc brake device equipped with the disc rotor.

2. Description of the Related Art

Conventionally, a disc brake device or a drum brake device has been widely used to brake a wheel of, for example, a motorcycle. The disc brake device includes a disc-shaped disc rotor having flat surfaces and a caliper configured to seize the surfaces of the disc rotor to brake the disc rotor. The disc rotor is mounted coaxially on the wheel on a lateral side of the wheel. The disc rotor is mounted on a hub of the wheel such that the surfaces thereof are substantially perpendicular to a rotational axis of the disc rotor. The caliper is provided with pads having contact surfaces (seizing surfaces) configured to contact the disc rotor, and the contact surfaces of the pads are shaped to be flat to conform in shape to the contact surfaces (brake surfaces) of the disc rotor.

The disc rotor rotates along with the wheel. When a rider operates a brake lever, the caliper moves, and the pads of the caliper seize the disc rotor to thereby brake the wheel. In this operation, the pads and the disc rotor contact each other under a relatively large pressure, and therefore, friction heat is generated between the pads and the disc rotor. Typically, the disc brake device allows heat radiation better than that of the drum brake device, because the contact surface (brake surface) of the disc brake device is exposed to the outside, and hence to wind flowing from forward of the motorcycle.

However, in the conventional disc brake device, since the disc rotor has flat disc-shaped surfaces and is mounted coaxially on the wheel on the lateral side as described above, a contact area of the disc rotor which contacts the wind flowing from forward is relatively small. Accordingly, in recent years, there has been a need for improvement of heat radiation in the disc rotor.

SUMMARY OF THE INVENTION

The present invention addresses the above described condition, and an object of the present invention is to provide a disc rotor capable of improving heat radiation, and a disc brake device equipped with the disc rotor.

According to one aspect of the present invention, there is provided a disc rotor of a disc brake device for a vehicle, the disc rotor being substantially disc-shaped, comprising a flange portion with which the disc rotor is mounted on a wheel of the vehicle, and a brake portion formed coaxially with a rotational axis of the disc rotor and configured to be seized by a caliper of the disc brake device, wherein the brake portion is configured to protrude in one direction of the rotational axis relative to the flange portion. In such a construction, since the contact area of the disc rotor which contacts air flowing from forward increases during travel of the vehicle, compared to a conventional disc rotor, heat radiation of the disc rotor can be improved.

The brake portion may have brake surfaces configured to be contacted by pads of the caliper, and the brake surfaces may be inclined with respect to the rotational axis of the disc rotor.

A circular center hole may be formed in a center portion of the disc rotor, the brake portion may be located radially outward relative to the center hole, and the flange portion may be located radially outward relative to the brake portion.

The flange portion may be located in a center portion of the disc rotor, and the brake portion may be located radially outward relative to the flange portion.

According to another aspect of the present invention, there is provided a brake device for a vehicle, comprising a substantially-disc shaped disc rotor including a flange portion with which the disc rotor is mounted on a wheel of the vehicle, and a brake portion formed coaxially with a rotational axis of the wheel, the brake portion having brake surfaces inclined with respect to the rotational axis, and a caliper including pads having contact surfaces configured to contact the brake surfaces of the disc rotor, the contact surfaces being inclined with respect to the center axis of the disc rotor and substantially conforming in shape to the brake surfaces of the disc rotor, wherein the brake portion is configured to be seized by the pads of the caliper to allow the vehicle to be braked.

In such a construction, heat radiation of the disc rotor can be improved, and a braking function of the caliper can be enhanced.

The disc rotor may be provided with a circular center hole formed in a center portion thereof, the brake portion may be located radially outward relative to the center hole, the flange portion may be located radially outward relative to the brake portion, the caliper may have a body including an extending portion extending radially outward from the center hole along the brake surfaces of the disc rotor, and the pads may be provided on the extending portion of the body of the caliper.

The flange portion may be formed in a center portion of the disc rotor, the brake portion may be located radially outward relative to the flange portion, the caliper may have a body including an extending portion extending radially inward from an outer peripheral side of the brake portion along the brake surfaces of the disc rotor, and the pads may be provided on the extending portion of the body of the caliper.

The above and further objects and features of the invention will be more fully be apparent from the following detailed description with accompanying drawings.

DETAILED DESCRIPTION OF THE
PREFERRED EMBODIMENTS

Figure 1:
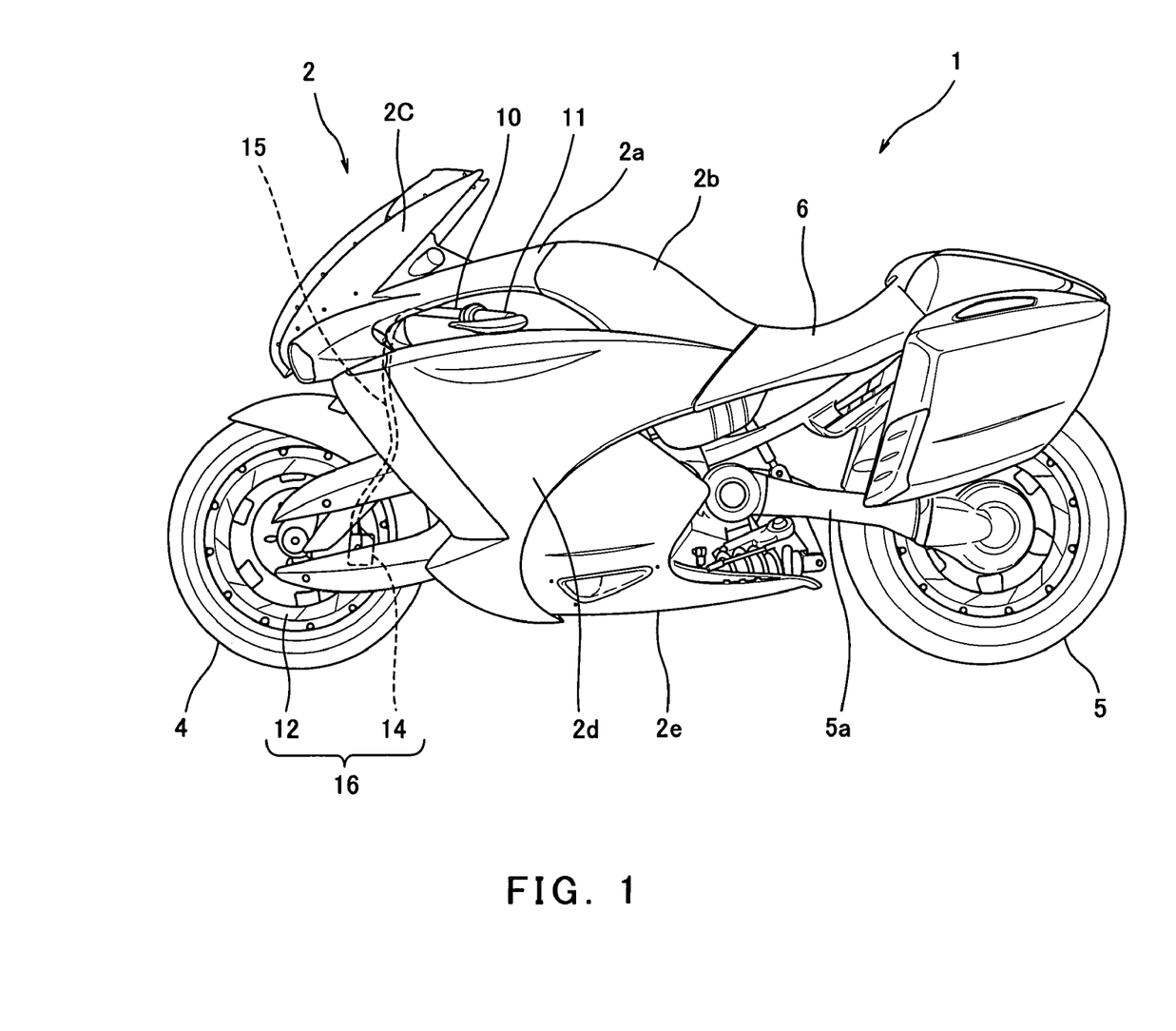
FIG. 1 is a side view of a motorcycle equipped with a disc brake device according to an embodiment of the present invention.

Hereinafter, a disc rotor and a disc brake device according to an embodiment of the present invention will be described with reference to the drawings. FIG. 1 is a side view of a motorcycle 1. Referring to FIG. 1, the motorcycle 1 is equipped with a cowling 2, and has a front wheel 4 which is a steering wheel and a rear wheel 5 which is a drive wheel at front and rear positions in a longitudinal direction of a body of the motorcycle 1. The rear wheel 5 is rotatably mounted at a rear end portion of a swing arm 5a extending in the longitudinal direction. A front end portion of the swing arm 5a is supported on an engine (not shown) mounted in the motorcycle 1 to allow the swing arm 5a to be pivotable around the front end portion. A drive shaft (not shown) is stored within the swing arm 5a. An output shaft of the engine is coupled to the drive shaft through a bevel gear or the like to allow rotation of the engine to be transmitted to the rear wheel 5 through the drive shaft.

A handle bar 10 is attached substantially above the front wheel 4. The handle bar 10 has grips 11 at end portions thereof. A seat 6 is disposed behind the handle bar 10 and forward and above the rear wheel 5. A rider straddles the seat 6 and grips the grips 11 to steer the motorcycle 1. As used herein, the term indicating direction means a direction seen from the perspective of the rider riding on the motorcycle 1.

As shown in FIG. 1, the cowling 2 is composed of a plurality of parts and equipped on the body of the motorcycle 1. Specifically, an upper cowling 2a extends in the longitudinal direction to cover the handle bar 10 from above. A tank cover 2b is provided between the upper cowling 2a and the seat 6 to cover a fuel tank (not shown) from above. A windshield (or screen) 2c is provided on an upper portion of the upper cowling 2a to extend upward and rearward. The windshield 2c serves to reduce a wind pressure applied to an upper body of the rider traveling on the motorcycle 1.

A side cowling 2d is provided below the upper cowling 2a and the tank cover 2b to cover right and left side portions of a front portion of the body of the motorcycle 1. The side cowling 2d is inverted-triangle shaped as seen in a side view such that its pointed portion on the lower side is located in the vicinity of a lower end of the body of the motorcycle 1 and its upper line extends in the longitudinal direction below the handle bar 10. The side cowling 2d is slightly curved outward as seen in a plan view such that a distance between right and left parts thereof gradually increases to a position in the direction from the front to the rear and then decreases as the side cowling 2d is closer to the rear of the body to allow the air flowing from forward to be smoothly guided rearward during travel. And, a lower cowling 2e is provided below the side cowling 2d to cover side portions of a front portion of the engine and a lower portion of the body.

As shown in FIG. 1, the motorcycle 1 is equipped with a disc brake device 16 including a disc rotor 12 mounted on the front wheel 4 and a caliper 14 configured to seize the disc rotor 12 to brake rotation of the front wheel 4. The caliper 14 is connected to a master cylinder (not shown) mounted in a body of the motorcycle 1 through a hydraulic hose 15.

Figure 2:
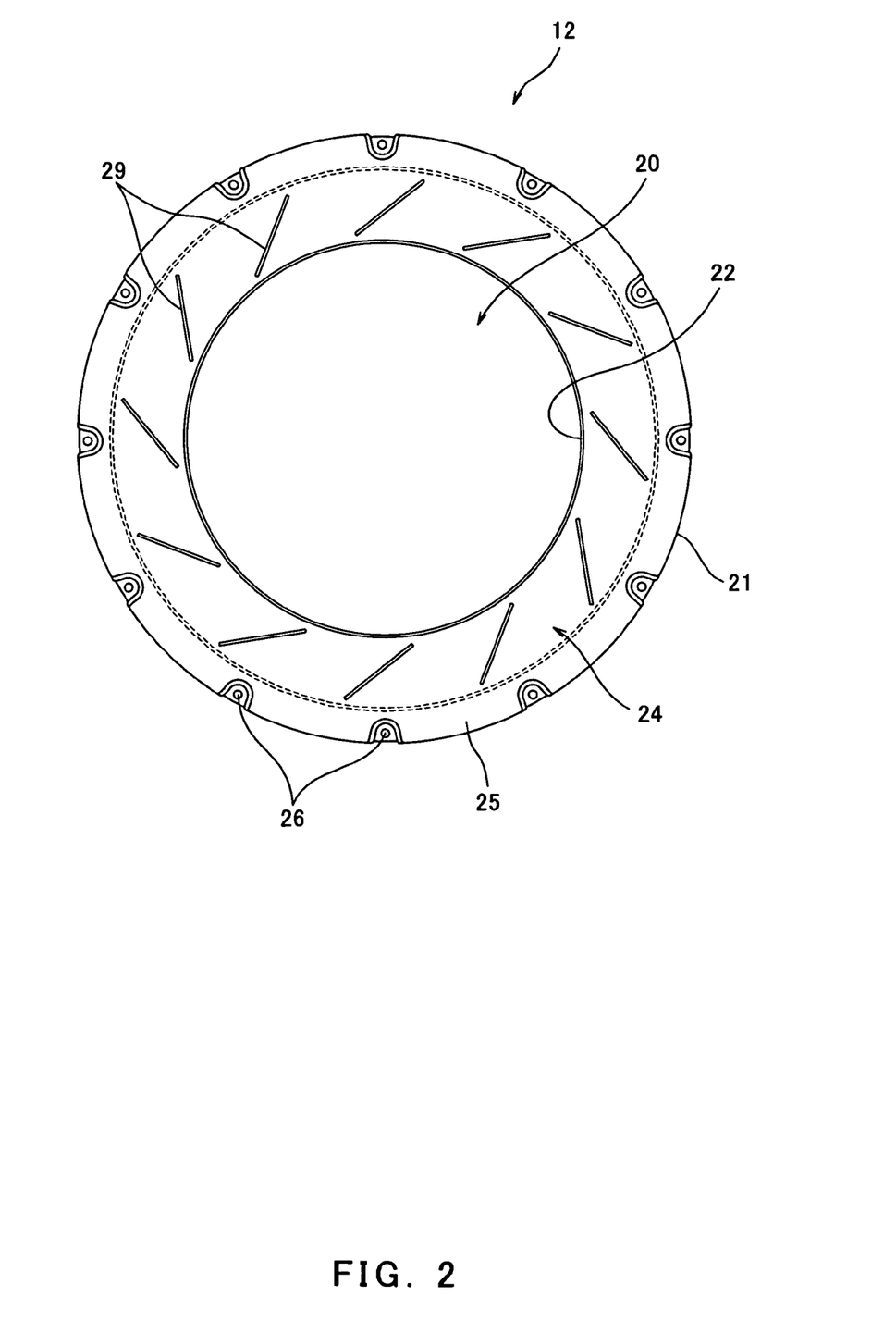
FIG. 2 is a left side view of a disc rotor equipped in the motorcycle in FIG. 1.
Figure 3:
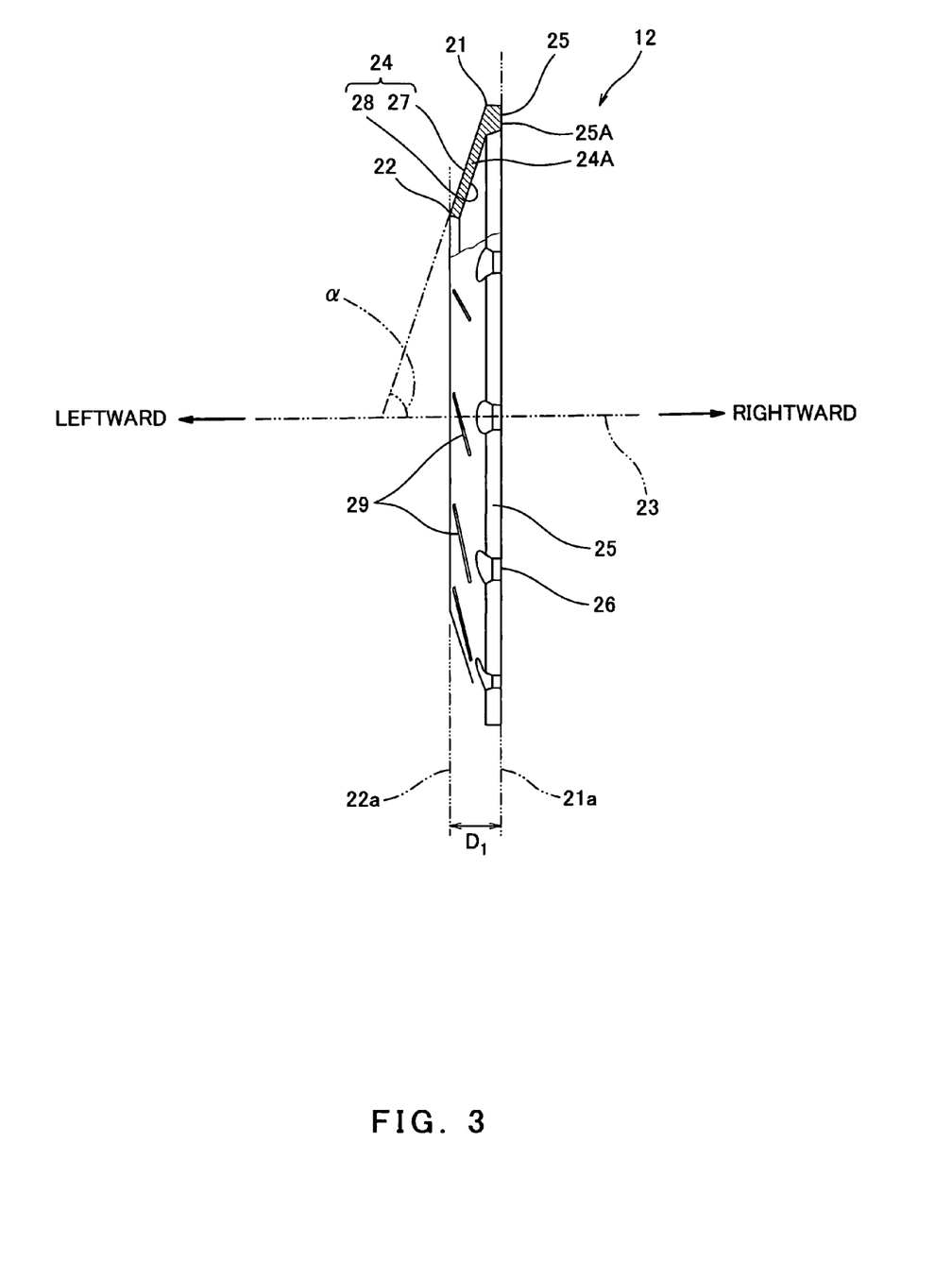
FIG. 3 is a partially cut away plan view of the disc rotor in FIG. 2.

FIG. 2 is a side view of the disc rotor 12 as seen from its outer surface side of the motorcycle 1 (left side of the body of the motorcycle 1) along a rotational axis 23 of the disc rotor 12. FIG. 3 is a partially cut away plan view of the disc rotor 12. As shown in FIG. 2, the disc rotor 12 has a circular large-diameter center hole 20. The disc rotor 12 is disc-shaped as seen in a side view. And, as shown in FIG. 3, the disc rotor 12 has a frustoconical shape with a height that is smaller than a diameter of a bottom surface when the height is defined in the direction of the rotational axis 23. More specifically, an inner periphery 22 of the disc rotor 12 is located leftward relative to an outer periphery 21 in the direction of the rotational axis 23, i.e., on outer side with the disc rotor 12 mounted on the body of the motorcycle 1. And, a plane 22a including the inner periphery 22 is located leftward to be spaced a predetermined distance D1 apart from a plane 21a including the outer periphery 21.

A plate-shaped inclined portion 24A is provided between the outer periphery 21 and the inner periphery 22 such that the inclined portion 24A is inclined with respect to the rotational axis 23 and its inner and outer surfaces are parallel to each other. The inclined portion 24A has a brake portion 24 configured to be seized by the caliper 14. In this embodiment, with the disc rotor 12 cut along any plane including the rotational axis 23, the inner and outer surfaces of the cross section of the inclined portion 24A including the brake portion 24 are inclined at a predetermined angle α with respect to the rotational axis 23. As shown in FIG. 2, the brake portion 24 is provided with a number of slits 29 extending in inclined state radially outward in the direction from the inner periphery 22 toward the outer periphery 21 and arranged to be circumferentially spaced apart from one another. In this embodiment, as shown in FIG. 3, a portion of the outer surface of the disc rotor 12, extending from the outer periphery 21 to the inner periphery 22, is inclined at a fixed angle α with respect to the rotational axis 23, and a portion of the inner surface of the disc rotor 12, excluding a flange portion 25 to be described later, is inclined at the fixed angle α with respect to the rotational axis 23. However, it will be appreciated that this structure is exemplary, and other suitable structures may be utilized for the disc rotor 12.

The flange portion 25 is formed along a circumference of the outer periphery 21 of the disc rotor 12. A mounting surface 25A at which the disc rotor 12 is mounted on the wheel is formed on the inner surface of the flange portion 25 to be perpendicular to the rotational axis 23 of the disc rotor 12. And, the flange portion 25 is provided with a number of mounting holes 26. As shown in FIG. 3, an outer surface and an inner surface of the inclined portion 24A formed between the flange portion 25 and the inner periphery 22 form an outer brake surface 27 and an inner brake surface 28, respectively. The outer brake surface 27 and the inner brake surface 28 are seized by pads 41A, 41B, 42A and 42B (see FIG. 6) of the caliper 14 which will be described later.

Figure 4:
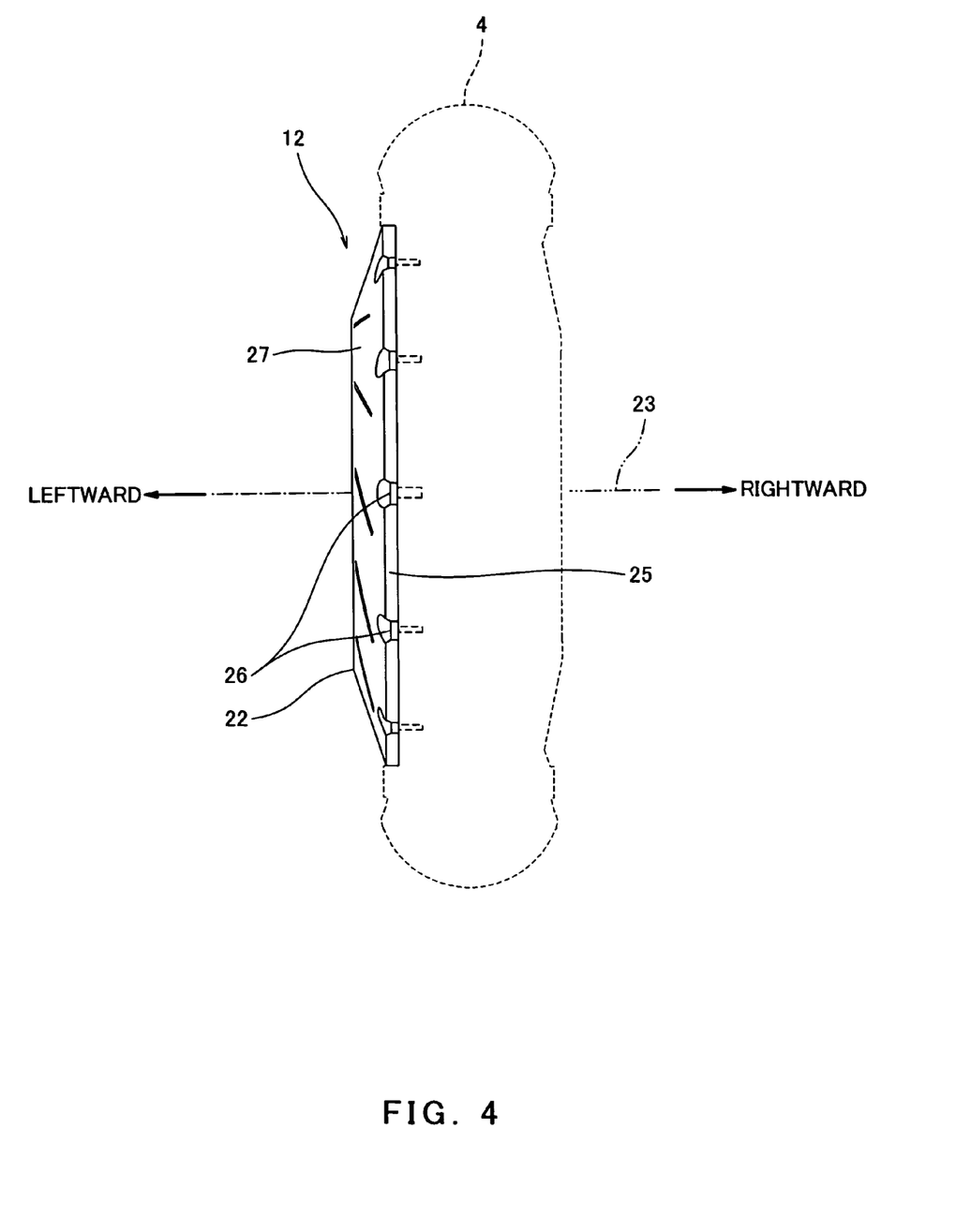
FIG. 4 is a plan view of the disc rotor in FIG. 2, which is mounted on a front wheel as indicated by a broken line.

FIG. 4 is a plan view of the disc rotor 12 mounted on the front wheel 4 as seen from above. The disc rotor 12 is mounted coaxially on the front wheel 4, and the flange portion 25 is screwed to wheel ribs (not shown) of the front wheel 4 through the mounting holes 26. In this construction, the inner periphery 22 and the brake portion 24 protrude leftward relative to the front wheel 4, and the outer brake surface 27 also protrudes leftward relative to the front wheel 4. The outer brake surface 27 having such a structure contacts sufficient wind flowing from forward of the motorcycle 1 during travel, thereby radiating heat efficiently.

Figure 5:
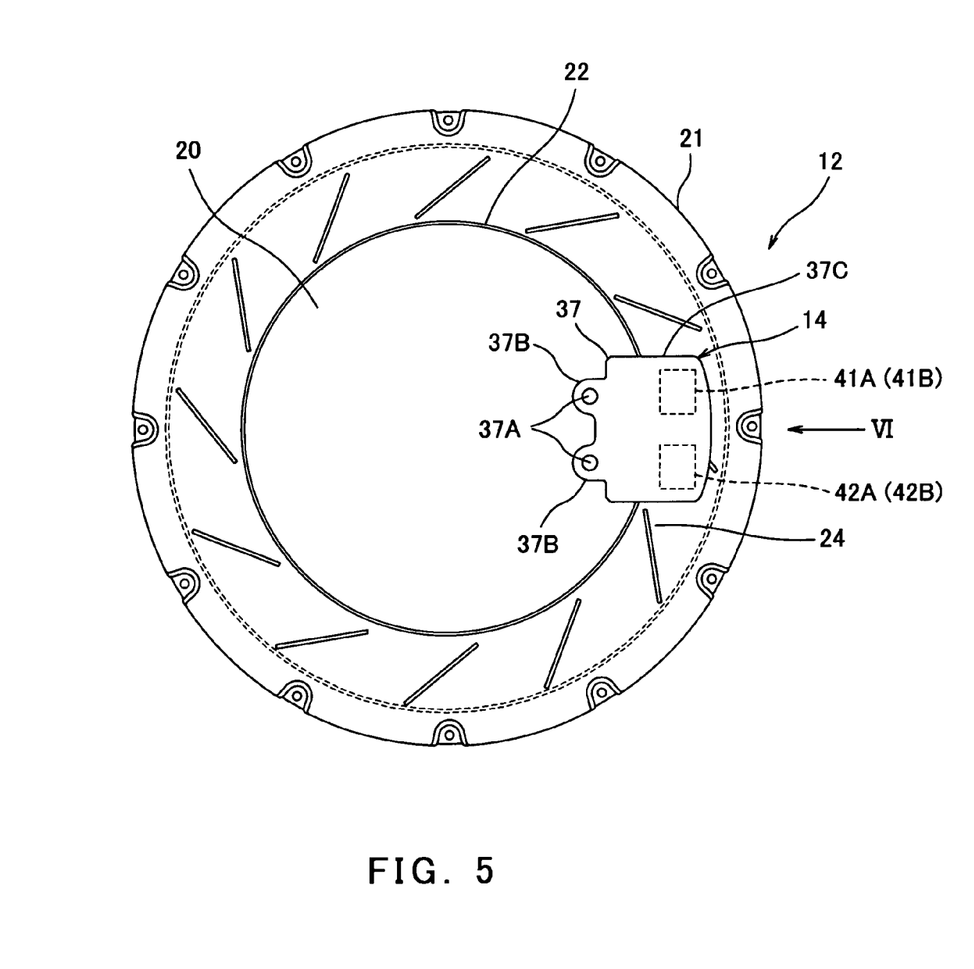
FIG. 5 is a left side view of the disc rotor with a caliper positioned in the vicinity of the disc rotor.
Figure 6:
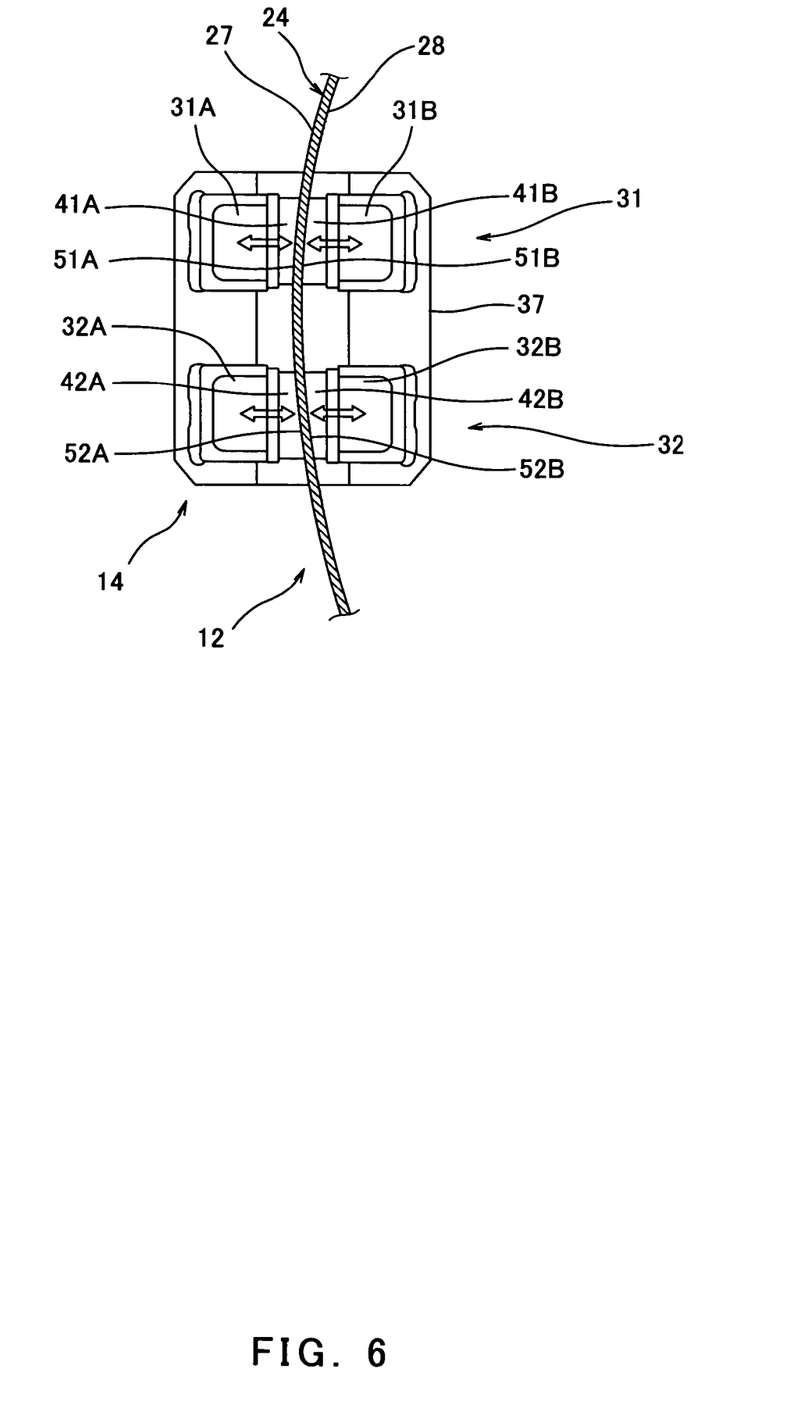
FIG. 6 is a schematic view of the caliper in FIG. 5, taken in the direction of arrow VI in FIG. 5, showing the disc rotor in cross section.

FIG. 5 is a side view of the disc rotor 12 with the caliper 14 disposed in the vicinity of the disc rotor 12, as seen from the left side. FIG. 6 is a schematic view of the caliper 14 in FIG. 5 as seen from the direction of arrow VI in FIG. 5, showing the disc rotor 12 in cross section. As shown in FIG.

5, the caliper 14 is disposed on the inner periphery 22 side of the disc rotor 12 so as to extend radially outward from the center hole 20, and configured to seize the brake portion 24 as shown in FIG. 6.

As shown in FIGS. 5 and 6, the caliper 14 has a body 37 including a mounting portion 37B fixed to the body of the motorcycle 1 through mounting holes 37A of the mounting portion 37B in the center hole 20 of the disc rotor 12, i.e., inward relative to the inner periphery 22 and an extending portion 37C structured such that its inner and outer portions extend radially outward from the mounting portion 37B in the center hole 20 along the inner brake surface 28 and the outer brake surface 27, respectively. The extending portion 37c of the body 37 of the caliper 14 contains a first seizing portion 31 composed of two pistons 31A and 31B opposed to the brake surfaces 27 and 28, respectively, and opposed to each other, and a second seizing portion 32 composed of two pistons 32A and 32B opposed to the brake surfaces 27 and 28, respectively, and opposed to each other.

Pads 41A and 41B are mounted to opposed surfaces of the piston 31A and 31B of the first seizing portion 31, and pads 42A and 42B are mounted to opposed surfaces of the pistons 32A and 32B of the second seizing portion 32. The caliper 14 is disposed such that the pads 41A and 41B sandwich the brake portion 24 and the pads 42A and 42B sandwich the brake portion 24, and such that the pads 41A and 42A are opposed to the outer brake surface 27 and the pads 41B and 42B are opposed to the inner brake surface 28.

Since the disc rotor 12 has a frustoconical shape as stated above, the outer brake surface 27 forms a convex curved surface having a circumferential curvature and the inner brake surface 28 forms a concave curved surface having a circumferential curvature identical to that of the outer brake surface 27. Further, opposed surfaces 51A and 52A of the pads 41A and 42A which are opposed to the outer brake surface 27 form concave curved surfaces having a curvature identical to that of the outer brake surface 27, and opposed surfaces 51B and 52B of the pads 41B and 42B which are opposed to the inner brake surface 28 form convex curved surfaces having a curvature identical to that of the inner brake surface 28.

In this construction, when the pistons 31A and 31B of the first seizing portion 31 move, the opposed surfaces 51A and 51B of the pads 41A and 41B are entirely brought into contact with the outer brake surface 27 and the inner brake surface 28, respectively, with a substantially uniform pressure, thereby causing the disc rotor 12 to be braked. Likewise, when the piston 32A and 32B of the second seizing portion 32 move, the opposed surfaces 52A and 52B of the pads 42A and 42B are entirely brought into contact with the outer brake surface 27 and the inner brake surface 28, respectively, with a substantially uniform pressure, thereby causing the disc rotor 12 to be braked. In other words, the curved brake surfaces 27 and 28 of the disc rotor 12 are seized by the curved opposed surfaces 51A and 51B of the pads 41A and 41B and the curved opposed surfaces 52A and 52B of the pads 42A and 42B, thereby causing the disc rotor 12 to be braked.

Figure 7:
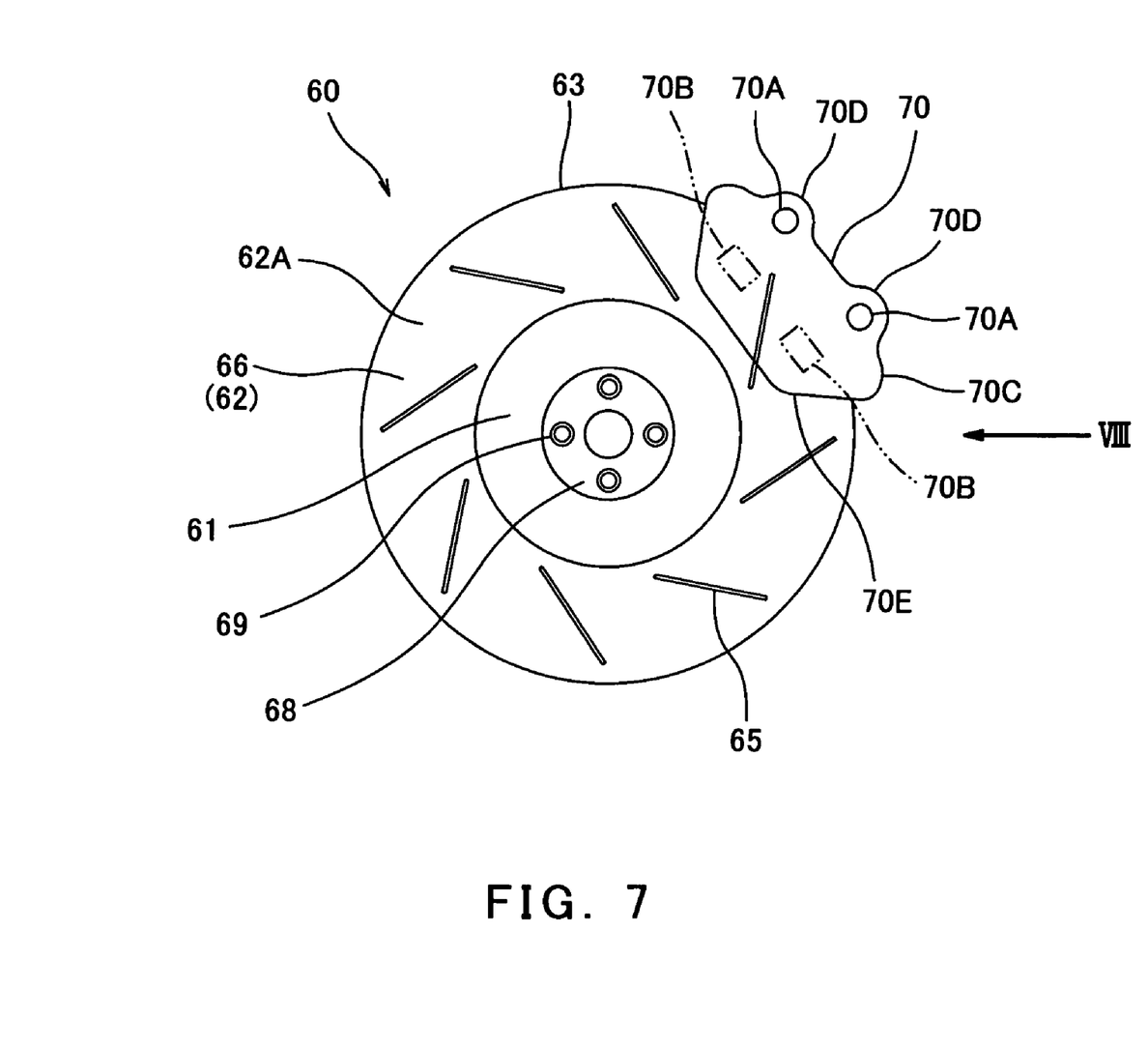
FIG. 7 is a left side view schematically showing another construction of the disc rotor with a caliper.
Figure 8:
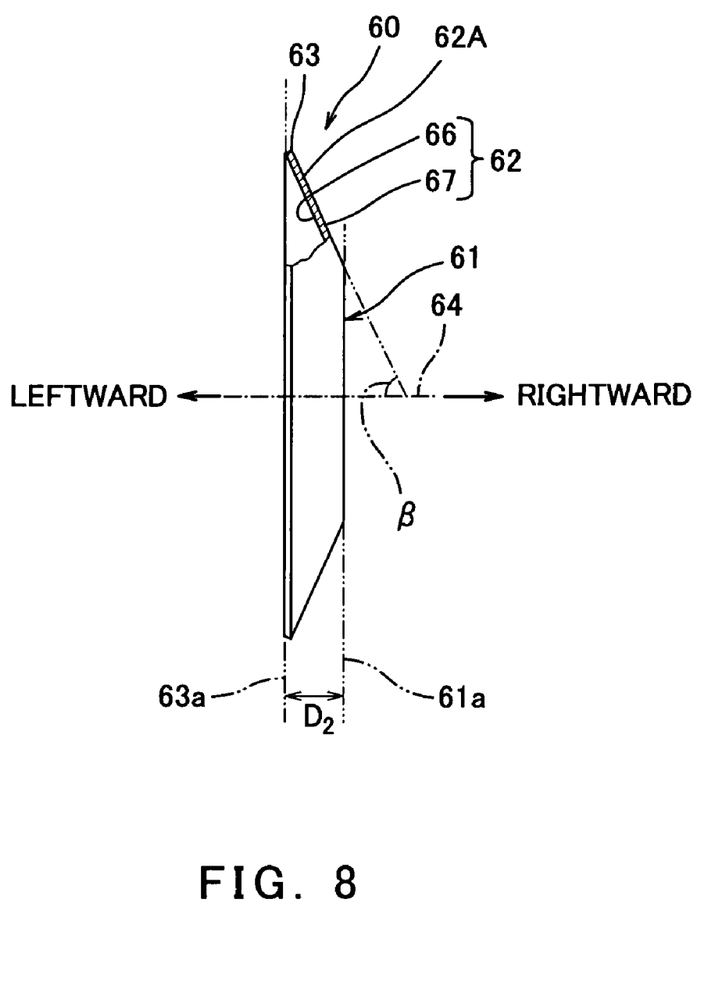
FIG. 8 is a partially cut away view of a construction of the disc rotor, taken along arrow VIII in FIG. 7.

The construction of the disc rotor of the disc brake device 16 is not intended to be limited to the above described structure of the disc rotor 12. FIGS. 7 and 8 are schematic views showing alternative construction of the disc rotor 12. FIG. 7 is a side view of a disc rotor 60 with a caliper 70 as seen from the left side, and FIG. 8 is a partially cutaway view of the disc rotor 60 taken in the direction of arrow VIII in FIG. 7.

As shown in FIGS. 7 and 8, the disc rotor 60 is disc-shaped as seen in a side view, and has a flat center portion 61 forming a circular region at the center and an inclined portion 62A extending radially outward from an outer periphery of the center portion 61. The inclined portion 62A has a brake portion 62 of the disc rotor 60. In other words, the disc rotor 60 has a frustoconical shape with a height that is smaller than a diameter of a bottom surface when the height is defined in the direction of a rotational axis 64 of the disc rotor 60. More specifically, the disc rotor 60 is constructed such that an outer periphery 63 of the brake portion 62 is located leftward relative to the center portion 61, i.e., outer side with the disc rotor 60 mounted on the body of the motorcycle 1. And, a plane 63a including the outer periphery 63 is located leftward to be spaced a predetermined distance D2 apart from a plane 61a including the center portion 61. And, with the disc rotor 60 cut along any plane including the rotational axis 64, inner and outer surfaces of a cross section of the brake portion 62 are inclined at a predetermined angle $\beta$ with respect to the rotational axis 64.

The brake portion 62 of the disc rotor 60 is provided with a number of slits 65 extending in inclined state radially inward in the direction from the inner side to the outer side and arranged to be circumferentially spaced apart from one another. And, the outer surface and the inner surface of the brake portion 62 form an outer brake surface 66 and an inner brake surface 67, respectively, which are seized by pads 70B of the caliper 70, respectively. More specifically, the caliper 70 has a body 70C including a mounting portion 70D fixed to the body of the motorcycle 1 (not shown) through mounting holes 70A of the mounting portion 70D on an outer side of the outer periphery 63 of the disc rotor 60 and an extending portion 70E structured such that its inner and outer portions extend radially inward from the mounting portion 70D along the inner and outer surfaces of the disc rotor 60, respectively. Further, the pads 70B are provided on the extending portion 70E to sandwich the brake portion 62 of the disc rotor 60.

A flange portion 68 is formed at a center portion of the center portion 61 of the disc rotor 60 and is provided with a number of mounting holes 69. The disc rotor 60 is mounted coaxially on the front wheel 4 such that the flange portion 68 is screwed to a hub of a wheel (not shown) of the front wheel 4 through the mounting holes 69. In this construction, brake portion 62 of the disc rotor 60 tends to be exposed to wind flowing from forward of motorcycle 1 during travel. As a result, heat radiation of the disc rotor 60 can be improved.

The diameter of the center portion 20 of the disc rotor 12 and the outer diameter of the disc rotor 60 may be suitably set considering desired heat radiation amount. For example, in order to further improve heat radiation in the disc rotor 12, a contact area between the inclined portion 24A and the wind may be increased by reducing the diameter of the center hole 20 or by reducing the angle $\alpha$ of the inclined surface of the inclined portion 24A. While the disc rotor and the disc brake device according to the present invention are applied to the motorcycle 1 in the embodiment described so far, the present invention may alternatively be applicable to other types of motorcycles, for example, four-wheeled vehicle.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A disc rotor of a disc brake device for a vehicle, the disc rotor being substantially disc-shaped, comprising:
    a flange portion with which the disc rotor is mounted on a wheel of the vehicle; and
    a brake portion formed coaxially with a rotational axis of the disc rotor and configured to be seized by a caliper of the disc brake device;
    wherein the flange portion has a mounting portion configured to attach the disc rotor to the wheel;
    wherein the brake portion is configured to protrude in one direction of the rotational axis relative to the flange portion; and
    wherein the brake portion has brake surfaces formed at both side surfaces of the disc-shaped disc rotor and configured to be contacted by pads of the caliper, the brake surfaces respectively having sliding surfaces which the pads are configured to directly slidably contact, the brake portion being configured to be seized by the pads directly in contact with the sliding surfaces, the sliding surfaces being inclined in one direction with respect to the rotational axis of the disc rotor so that the sliding surfaces are visible from a direction perpendicular to the rotational axis of the disc rotor and being parallel to each other.

2. The disc rotor of a disc brake device for a vehicle according to claim 1, wherein the brake portion extends continuously and obliquely from the flange portion.

3. The disc rotor of a disc brake device for a vehicle according to claim 1, wherein a circular center hole is formed in a center portion of the disc rotor, the brake portion is located radially outward relative to the center hole, and the flange portion is located radially outward relative to the brake portion.

4. The disc rotor of a disc brake device for a vehicle according to claim 2, wherein the flange portion is located in a center portion of the disc rotor, and the brake portion is located radially outward relative to the flange portion.

5. A brake device for a vehicle, comprising:
    a substantially-disc shaped disc rotor including a flange portion with which the disc rotor is mounted on a wheel of the vehicle, and a brake portion formed coaxially with a rotational axis of the wheel, the brake portion having brake surfaces inclined with respect to the rotational axis formed at both side surfaces of the disc-shaped disc rotor; and
    a caliper including pads having contact surfaces configured to contact the brake surfaces of the disc rotor, the contact surfaces being inclined with respect to the center axis of the disc rotor and substantially conforming in shape to the brake surfaces of the disc rotor;
    wherein the flange portion has a mounting portion configured so as to attach the disc rotor to the wheel;
    wherein the brake surfaces respectively have sliding surfaces which the pads are configured to directly slidably contact;
    wherein the pads are disposed on both sides of both side surfaces of the disc rotor to be opposite to the brake surfaces, respectively; and
    wherein the brake portion is configured to be seized by the pads of the caliper in such a manner that the pads are directly in contact with the sliding surfaces of both side surfaces of the disc rotor to sandwich and seize the brake portion to allow the vehicle to be braked, the sliding surfaces being inclined in one direction with respect to the rotational axis of the disc rotor so that the sliding surfaces are visible from a direction perpendicular to the rotational axis of the disc rotor and being parallel to each other.

6. The brake device for a vehicle according to claim 5, wherein the disc rotor is provided with a circular center hole in a center portion thereof, the brake portion is located radially outward relative to the center hole, and the flange portion is located radially outward relative to the brake portion, and
    the caliper has a body including an extending portion extending radially outward from the center hole along the brake surfaces of the disc rotor, and the pads are provided on the extending portion of the body of the caliper.

7. The brake device for a vehicle according to claim 5, wherein
    the flange portion is formed in a center portion of the disc rotor, the brake portion is located radially outward relative to the flange portion, the caliper has a body including an extending portion extending radially inward from an outer peripheral side of the brake portion along the brake surfaces of the disc rotor, and the pads are provided on the extending portion of the body of the caliper.

* * * * *